(12) United States Patent
Middleton et al.

(10) Patent No.: US 6,721,861 B2
(45) Date of Patent: Apr. 13, 2004

(54) INDICATOR OF VALIDITY STATUS INFORMATION FOR DATA STORAGE WITHIN A DATA PROCESSING SYSTEM

(75) Inventors: Peter Guy Middleton, Mougins (FR); David Michael Bull, Cambridgeshire (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 10/330,478

(22) Filed: Dec. 30, 2002

(65) Prior Publication Data

US 2003/0135701 A1 Jul. 17, 2003

Related U.S. Application Data

(63) Continuation-in-part of application No. 10/028,933, filed on Dec. 28, 2001.

(51) Int. Cl.[7] .............................................. G06F 12/00
(52) U.S. Cl. ........................ 711/156; 711/144; 711/154
(58) Field of Search ................................ 711/100, 118, 711/133, 144, 145, 154, 156

(56) References Cited

U.S. PATENT DOCUMENTS

| 4,794,523 | A | 12/1988 | Adan et al. ................. 713/100 |
| 5,287,481 | A | 2/1994 | Lin ............................. 711/135 |
| 5,325,503 | A | 6/1994 | Stevens et al. ............. 711/146 |
| 5,367,660 | A | 11/1994 | Gat et al. ...................... 711/3 |
| 5,423,019 | A | 6/1995 | Lin ............................. 711/135 |
| 5,517,626 | A | 5/1996 | Archer et al. ............... 710/110 |
| 5,566,324 | A | 10/1996 | Kass ........................... 711/160 |
| 5,586,294 | A | 12/1996 | Goodwin et al. ........... 711/137 |
| 5,966,728 | A | 10/1999 | Amini et al. ............... 711/146 |
| 6,178,481 | B1 | 1/2001 | Krueger et al. ............. 711/122 |

*Primary Examiner*—Tuan V. Thai
(74) *Attorney, Agent, or Firm*—Nixon & Vanderhye P.C.

(57) ABSTRACT

A valid memory 2 is provided storing valid words 8 with bit positions indicating whether corresponding cache lines within a cache memory 7 store valid data. Flip-flop circuits 4 are provided to indicate whether or not the valid words 8 within the valid memory 2 are themselves valid. The number of valid words 8 corresponding to an individual flip-flop circuit 4 varies in dependence upon the size of the valid memory 2. Thus, for example, a single flip-flop circuit 4 may indicate whether one, two, four or eight valid words 8 from the valid memory 2 are storing valid data depending upon the particular size of the valid memory 2 employed.

10 Claims, 6 Drawing Sheets

FIG. 1

| Cache Size(KB) | # DTypes | Words per DType |
|---|---|---|
| 4 | 8 | 1 |
| 8 | 16 | 1 |
| 16 | 32 | 1 |
| 32 | 64 | 1 |
| 64 | 128 | 1 |
| 128 | 256 | 1 |

FIG. 2

| Cache Size(KB) | # DTypes | Words per DType |
|---|---|---|
| 4 | 8 (24 unused) | 1 |
| 8 | 16 (16 unused) | 1 |
| 16 | 32 | 1 |
| 32 | 32 | 2 |
| 64 | 32 | 4 |
| 128 | 32 | 8 |

INDICATOR OF VALIDITY STATUS INFORMATION FOR DATA STORAGE WITHIN A DATA PROCESSING SYSTEM

This application is a continuation-in-part of application Ser. No. 10/028,933, filed Dec. 28, 2001, pending, the entire content of which is hereby incorporated by reference in this application.

BACKGROUND OF THE INVENTION

1. Field of the Invention

This invention relates to the field of data processing systems. More particularly, this invention relates to the storage of validity status information in respect of data words stored within a data processing system.

2. Description of the Prior Art

It is known from WO-A-00/75785 to provide a hierarchical arrangement for storing valid bits corresponding to cache lines within a data processing system. Within such an arrangement, a single bit may be used to indicate whether or not a word containing a plurality of lower level valid bits is itself valid. This approach is particularly well suited for use in synthesised circuit applications in order to provide a global invalidate function.

A problem arises in such systems when the size of the memory for which validity data is being stored is variable. As an example, a single synthesisable microprocessor core may be implemented with different sizes of cache memory. As the cache memory varies in size, so does the amount of validity data needing to be stored associated with the cache lines in that cache memory. In a situation with a valid memory storing valid words having bits representing the validity of individual cache lines, flip-flop circuits may be provided to represent the validity of the valid words themselves. Thus, when a fast high level global clear was desired, such as on a post-boot context switch, then all that need be done would be the resetting of all the flip-flop circuits to an invalid state which would consequently indicate that the entire contents of the valid memory was itself invalid. When the size of the valid memory can vary in dependence upon the size of the corresponding cache memory, there is also a need for a variable number of flip-flop circuits.

One simple approach to this situation would be to provide a number of flip-flop circuits within the synthesisable design that was sufficient to cope with the largest envisaged valid memory. This approach would have the disadvantage of including many redundant flip-flop circuits within implementations having a valid memory smaller than the maximum size resulting in a disadvantageous increase in circuit size, cost etc. A further more subtle problem is that when dealing with a large number of flip-flop circuits the data from which requires evaluation in parallel, there typically arises a need for disadvantageously wide multiplexers to select the appropriate signal values for controlling other operations. Wide multiplexers tend to introduce a comparatively large signal propagation delay and this can have a detrimental impact when such circuits find themselves upon critical timing paths within the system as a whole.

SUMMARY OF THE INVENTION

Viewed from one aspect the present invention provides apparatus for processing data, said apparatus comprising:

(i) a valid word memory operable to store a plurality of valid words, each valid word having bits representing whether or not corresponding data storage locations in a further memory are storing valid data; and (ii) a plurality of flip-flop circuits operable to store values indicative of whether or not corresponding valid words within said valid memory are themselves valid; characterised in that (iii) a flip-flop circuit is operable to store a value indicative of validity of a number of valid words which varies in dependence upon how many valid words may be stored in said valid memory.

The invention recognises that the number of valid words which correspond to a given flip-flop circuit need not be constant and could be varied in dependence upon the size of the valid memory. Thus, a relatively manageable number of flip-flop circuits may be provided to cope with the majority of valid memory sizes using one flip-flop circuit per valid word, but situations with larger valid memory sizes may be dealt with by arranging for a single flip-flop circuit to correspond to multiple valid words within the valid memory. The increase in circuit complexity needed to deal with configurations having different valid memory sizes is more than offset by the saving in circuit area achieved by not having to provide a large number of flip-flop circuits to cope with the worst case scenario of the largest possible valid memory.

Whilst the above technique is useful in a wide variety of situations, the arrangement of flip-flop circuits representing the validity of corresponding valid words is itself particularly well suited to embodiments providing a global invalidate operation whereby all valid words within the valid memory may be indicated as being invalid by forcing appropriate values into what will be a much smaller number of flip-flop circuits.

It will be appreciated that the memory architecture could take a wide variety of forms, but the invention is particularly well suited to situations in which the further memory is a cache memory. Such situations usually require the storage of and control by valid data corresponding to the validity of the data held within particular cache lines.

It will be appreciated that in situations where a single flip-flop circuit corresponds to a plurality of valid words, the changing to a valid status of the flip-flop circuit may well require changes in multiple corresponding valid words. Since the valid words will usually be accessible sequentially, particularly in the case of a synthesised design in which the valid memory is a synthesised RAM memory, multiple clock cycles may be needed to make all the changes to the valid words consequential upon a change in a value stored within a flip-flop circuit.

Particularly preferred embodiments of the invention perform such changes to the valid words in parallel with cache line fill operations. Cache line fill operations themselves, by their very nature, are generally slower than operations that are able to be serviced without a cache line fill and accordingly tend already to spread over multiple clock cycles. Thus, the overhead involved in sequentially performing multiple writes to valid words may effectively be hidden within the time that is typically already taken in servicing a cache line fill.

When a cache line fill occurs, it may be that only a single valid word is being changed to indicate the storage of a valid cache line, but in other embodiments it is possible that a cache refill operation may return multiple cache lines which need to be marked as valid within multiple valid words beneath a single flip-flop circuit.

Preferred circuit arrangements logically combine valid words with values stored in a plurality of flip-flop circuits both having been read in parallel. Such arrangements often require the wide multiplexers discussed previously and so are ones in which the present invention is particularly well suited.

Viewed from another aspect the present invention provides a method of processing data, said method comprising the steps of:
(i) storing a plurality of valid words within a valid word memory, each valid word having bits representing whether or not corresponding data storage locations in a further memory are storing valid data; and
(ii) storing within a plurality of flip-flop circuits values indicative of whether or not corresponding valid words within said valid memory are themselves valid; characterised in that
(iii) a flip-flop circuit stores a value indicative of validity of a number of valid words which varies in dependence upon how many valid words may be stored in said valid memory.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
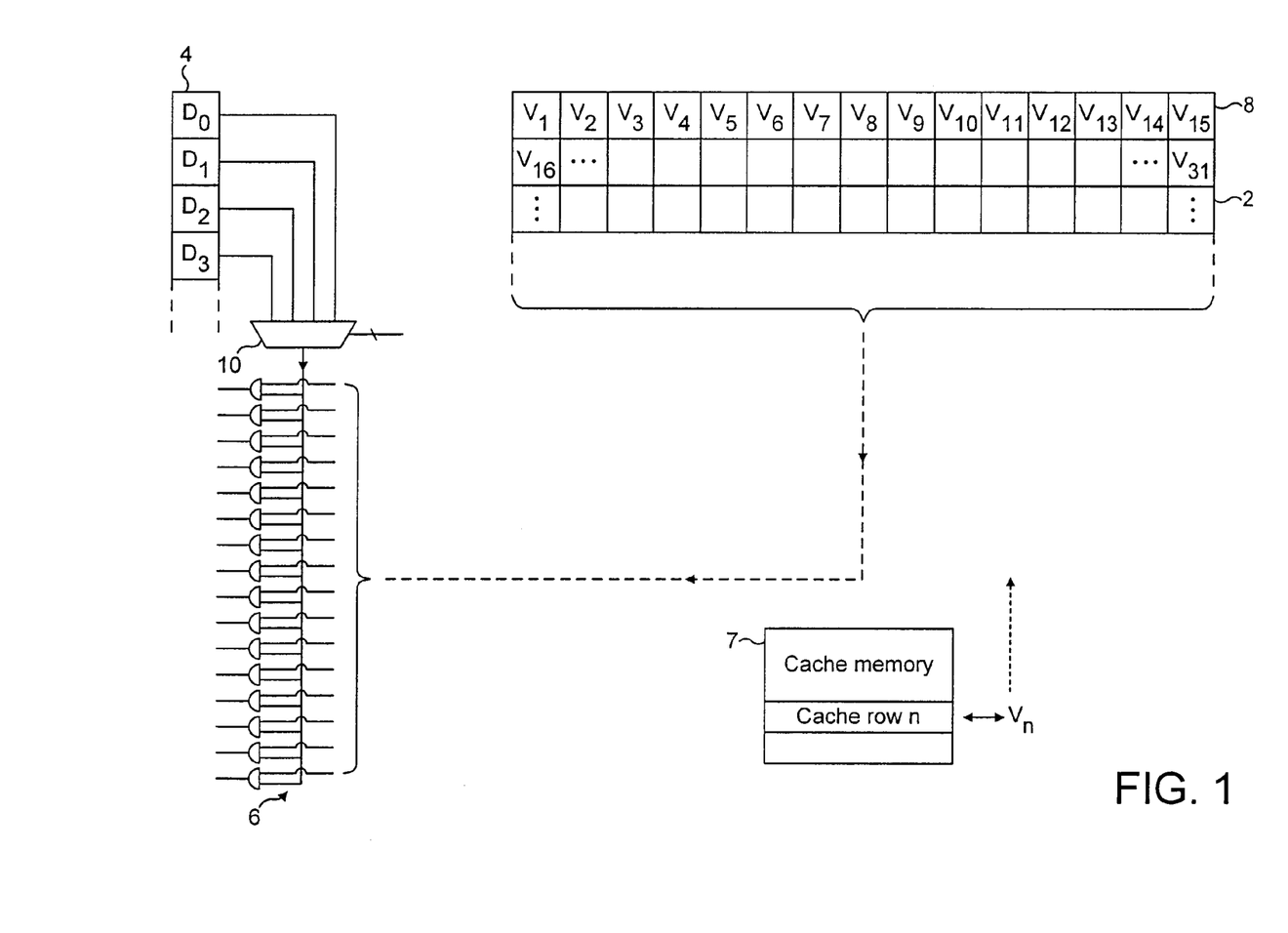
FIG. 1 schematically illustrates the relationship between a plurality of flip-flop circuits and a valid memory.

FIG. 1 illustrates the relationship between a valid memory 2, a plurality of flip-flop circuits 4 and circuitry 6 for logically combining valid words from the valid memory 2 and values stored within the flip-flop circuits 4. It will be understood that the circuits illustrated in FIG. 1 form a small part of a larger data processing system such as a cache controller controlling a cache memory 7 within a synthesisable microprocessor. Each valid word 8 within the valid RAM 2 contains multiple valid bits. In this example, the valid words are 16-bit words. Each bit within the valid word corresponds to the validity or non-validity of a cache line within an associated cache memory 7. The valid memory 2 may be implemented as a synthesised RAM memory. Such synthesised RAM memories can be read one word at a time and generally do not provide facilities for global resetting.

The plurality of flip-flop circuits 4 may be provided as D-Type latches each storing a bit indicating the validity or non-validity of one or more corresponding valid words 8 within the valid word memory 2. The flip-flop circuits 4 may be provided as different types of latches or in other ways providing that they serve to store bits of data corresponding to the validity of valid words 8.

In operation, when it is desired to determine the validity or non-validity of a cache line being accessed within the cache memory 7, then the valid word 8 for that cache line is read from the valid memory 4 in parallel with an operation that selects, using a multiplexer 10, the corresponding value stored within one of the flip-flop circuits 4. This value from the flip-flop circuit 4 is ANDed with the valid word to produce a 16-bit output representing the validity of 16 cache lines. The validity indicating signal from the AND circuits for the appropriate cache line may then be selected and read using another multiplexer to control cache operation in accordance with conventional techniques.

Figure 2:
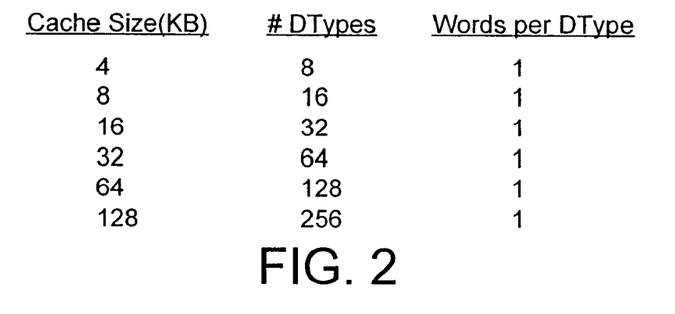
FIGS. 2 and 3 are tables illustrating an example of how the number of flip-flop circuits provided may vary in dependence upon cache size.

FIG. 2 is a table illustrating the number of flip-flop circuits 4 required for different cache sizes working on an assumption of 16-bit valid words 8 and with eight 32-bit words per line within the cache memory 7. It will be seen from this table that when a relationship is maintained of one flip-flop circuit 4 for each valid word 8 within the valid memory 2, then when the cache size is 128 kB, then 256 flip-flop circuits 4 are required. This is a disadvantageously large requirement.

Figure 3:
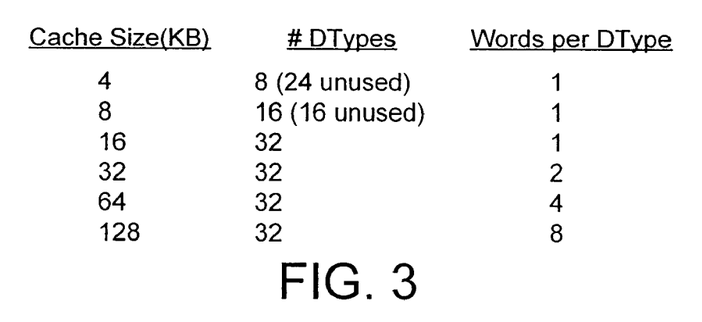

FIG. 3 illustrates an alternative in which the total number of flip-flop circuits 4 provided is limited to 32, but when the cache size increases above 16 kB, then a single flip-flop circuit 4 is made to correspond to an appropriate larger number of valid words 8. Thus, when the cache size is 32 kB, each flip-flop circuit 4 corresponds to two valid words 8 within the valid work memory 2. Similarly, when the cache size is 128 kB, each flip-flop 4 corresponds to eight valid words 8 within the valid memory 2.

Figure 4:
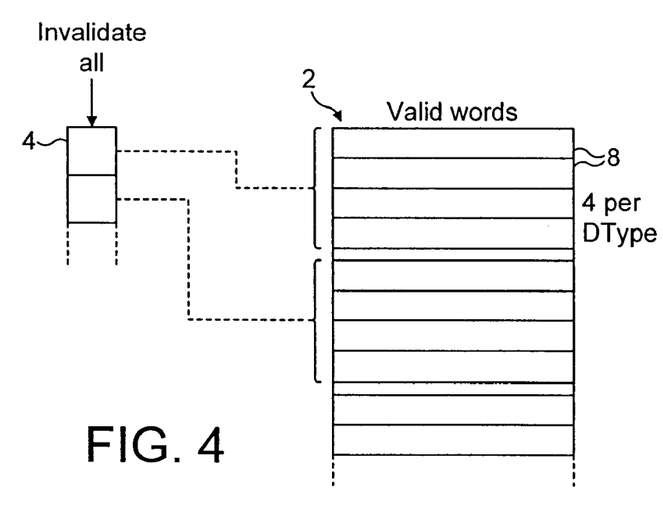
FIG. 4 illustrates an arrangement in which a single flip-flop circuit corresponds to multiple valid words.

FIG. 4 schematically illustrates the relationship between the flip-flop circuits 4 and cache lines 8 within a valid memory 2 in the situation where a single flip-flop circuit corresponds to four valid words 8. Also illustrated in FIG. 4 is the "invalidate all" signal that may be applied to the plurality flip-flop circuits in order that they may be subject to a single-cycle global clearing operation to indicate that all of the valid words within the valid memory 2 are invalid, and therefore the entire cache contents are invalid.

Figure 5:
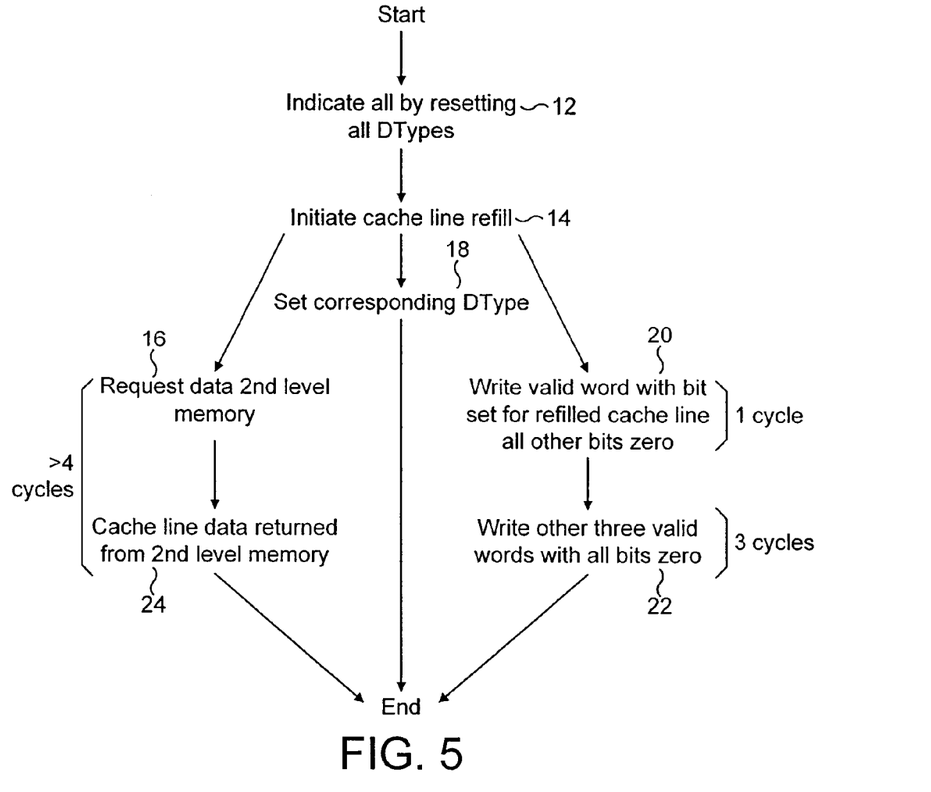
FIG. 5 schematically illustrates the steps performed when processing a cache line refill subsequent to a global reset within a system where a single flip-flop corresponds to multiple valid words and has indicated that the multiple words are not valid.

FIG. 5 illustrates the processing performed when a cache line refill occurs subsequent to a global clear within a system in which a single flip-flop circuit 4 corresponds to multiple valid words 8. At step 12, a global clear operation is performed that sets all of the values stored within the flip-flop circuit 4 to indicate that all of the valid words 8 within the valid memory 2 are invalid. At step 14, a cache line fill operation is initiated. It will be appreciated that such a cache line refill operation is triggered by activity outside of that previously described, such as general processing seeking to access a data value that is not held within the cache memory 7 and accordingly requires retrieving to the cache memory 7. Subsequent to step 14, three parallel processes are initiated. The request for the data required to fulfil the cache refill is issued to the second level memory at step 16. At the same time the flip-flop circuit 4 corresponding to the cache line being refilled is set to indicate its validity at step 18. At step 20 the valid word 8 within the valid memory 2 corresponding to the cache line being refilled is written with a valid word having a bit set for the refilled cache line and with all the other bits being set to zero.

As a consequence of the mapping of a single flip-flop circuit 4 to multiple valid words, step 22 is also required to write three further valid words 8 to the valid memory 2, in this case with all their bits set to zero to indicate that the corresponding cache lines are invalid. It will be appreciated that steps 20 and 22 are illustrated as the write of the valid word 8 corresponding to the cache line being refilled occurring first with the consequential subsequent writes to the valid words 8 not being the cache line refilled occurring later. In practice, the order of these operations may vary, e.g. the four valid words 8 may be written in the order in which they appear within the valid memory 2 with the valid word 8 corresponding to the cache line being refilled occurring at any position within those four valid words 8 being written.

In the particular example illustrated in FIG. 5, the writing of the valid words 8 is indicated as consuming four processing cycles. However, as will be appreciated by those familiar with the art, the requirement to fetch the data from the second level memory required to service the cache line refill will typically take considerably longer than four clock cycles. If in a best case scenario the data fetch from the second level memory only takes four cycles, then nevertheless the need to write multiple valid words 8 consequential upon the change of a single flip-flop may nevertheless be prevented from impacting the overall processing speed. At step 24, the cache line data is returned from the second level memory after an appropriate number of cycles delay required to set up and service the data fetch.

Figure 6:
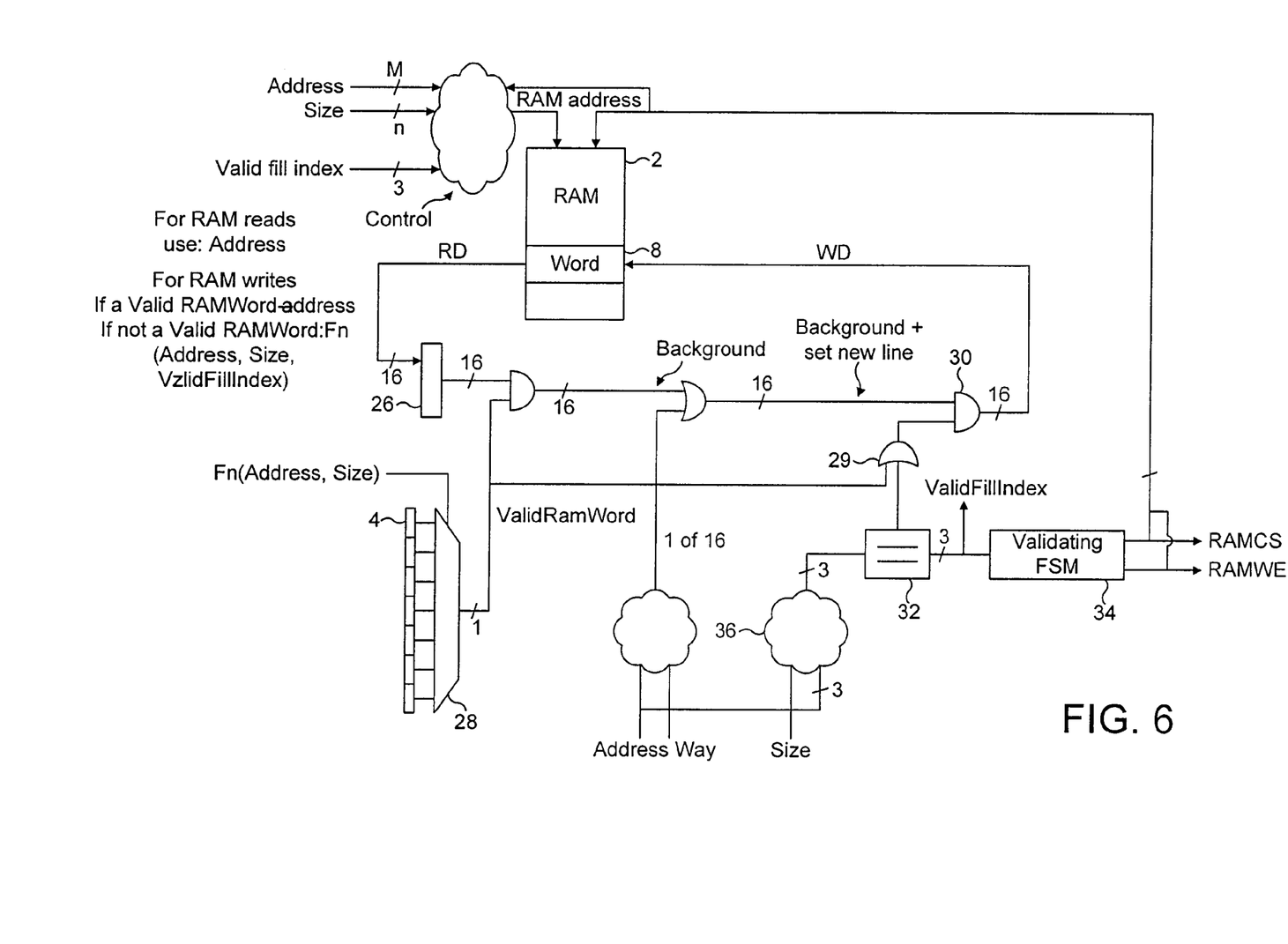
FIG. 6 schematically illustrates circuitry that may be used to control writing of valid words to a valid RAM upon a cache refill.

FIG. 6 schematically illustrates a circuit for controlling the writing of valid words 8 within the valid memory 2. When a valid word 8 is read from the valid memory 2 upon the read port RD, it is written to a register 26. The appropriate value from the plurality of flip-flop circuits (bank) 4 is selected by a multiplexer 28 in dependence upon the address being accessed and the size of the cache memory concerned. The single bit read from this selected flip-flop circuit 4 is logically ANDed with the read valid word. This produces a background valid word. If the signal value read from the flip-flop circuit 4 indicates that the valid word is invalid, then the ANDing will force this background valid word to be all zeros. However, if the value read from the flip-flop circuit indicates the valid word 8 is valid, then the background valid word will have bit values corresponding to those read from the valid memory 2 with individual bit positions indicating the validity or non-validity of corresponding cache lines. If a write is being made to the cache memory that will influence the validity of a cache line, then a modified valid word is determined in dependence upon the address being accessed and the number of cache ways to set a bit within a 16-bit word corresponding to the cache line being written. This value is then logically ORed with the background valid word to produce a new valid word having a set position corresponding to the cache line being written (it may be that this position was already set). If the value read from the flip-flop circuit 4 indicated that the valid word was valid, then a signal indicating this is passed by OR gate 29 to control a further AND gate 30 to pass the modified valid word back into the valid memory 2.

If the operation being performed is the writing of valid words 8 to the valid ram 2 subsequent to a cache line refill following a global clear, then this corresponds to the processing performed in steps 20 and 22 of FIG. 5. In this circumstance, the value read from the flip-flop circuit 4 will indicate that the valid words are invalid and accordingly OR gate 29 will not allow AND gate 30 to output anything other than all zeros unless comparitor 32 indicates a match between its inputs. A validating finite state machine 34 provides one of these inputs and produces a incrementing 3-bit count value in dependence upon how many valid words 8 are associated with a flip-flop circuit 4, which is in turn dependent upon the size of the associated valid memory/ cache memory. If only a single valid word is associated with a flip-flop circuit 4, then the finite state machine 34 will have a single state and will only output a 3-bit zero value. However, if, for example, four valid words were associated with a single flip-flop circuit 4, then the finite state machine 34 would successively output 3 bit values of 000, 001, 010 and 011 before returning to 000. Logic 36 dependent upon the address value of the cache line being accessed and the cache size outputs a 3-bit value which is also supplied as an input to the comparitor 32 and compared with the output of the finite state machine 34 to trigger the comparitor 32 to output a value of 1 when the valid word corresponding to the cache line being fetched in the cache line refill is reached. For this particular cache line, the AND gate 30 will then output the 16-bit valid word value formed from all zeros with a single bit set in dependence upon the cache line being refilled. This will then be written back to the appropriate storage location within the valid memory 2.

It will be appreciated that the address signal supplied to the valid memory 2 is dependent upon the address of the cache location being accessed, the size of the cache memory, whether or not the RAM word being accessed is valid and the 3-bit index value produced by the finite state machine 34. For a RAM read operation, the address applied to the valid memory 2 is only dependent upon the address of the cache line being accessed. When a write operation is being performed to the valid memory 2, then the address supplied when the valid word is valid is again simply the address of the cache line being accessed. However, when the valid word being accessed is invalid, then the more complicated situation in which multiple valid words need to be written is encountered and in this circumstance the addresses generated are dependent upon the address of the cache line being accessed, the size of the memory and the index value produced by the finite state machine 34, these being combined (most significant bit portions from the Address and, least significant portion from the Index value) in a manner dependent upon the Size value.

Figure 7:
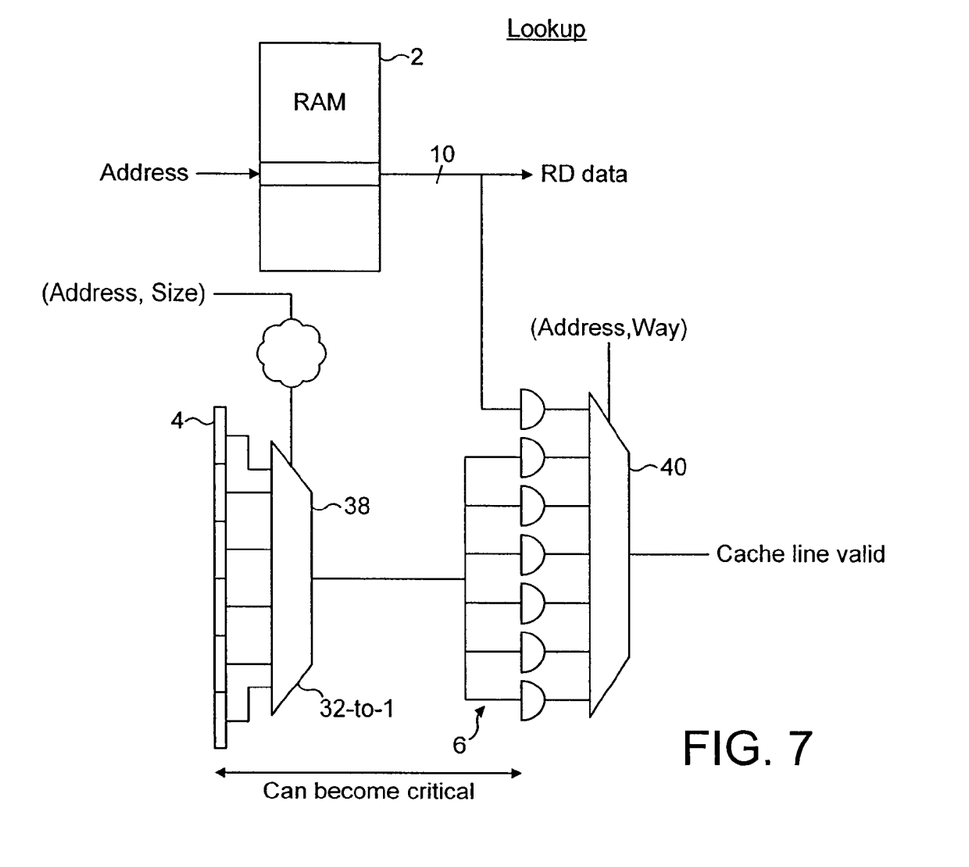
FIG. 7 schematically illustrates circuitry for performing a cache line validity lookup operation within which wide multiplexers can slow a critical path.

FIG. 7 illustrates the circuit path used in looking up whether a cache access is to a valid cache line. In this operation the appropriate value from within the flip-flop circuits 4 needs to be selected by a 32-to-1 multiplexer 38 before being passed to the AND gate logic 6. The AND gate logic 6 is also provided with the 16-bit valid word read from the valid memory 2. The logical combination of the value from the flip-flop circuit 4 and the particular bit position with the valid word 8 is selected by a further multiplexer 40 and provides the signal indicating whether the cache line being accessed is valid.

It will be seen from FIG. 7 that should the number of flip-flop circuits 4 employed become very large, then the multiplexer 38 will become very wide. Wide multiplexers are generally slower and accordingly the path from the flip-flop circuits 4 through the multiplexer 38 to the AND gate logic 6 may become a critical path in the overall system restricting system performance. This is avoided by the capping of the total number of flip-flop circuits 4 that is provided by the above described techniques.

Figure 8:
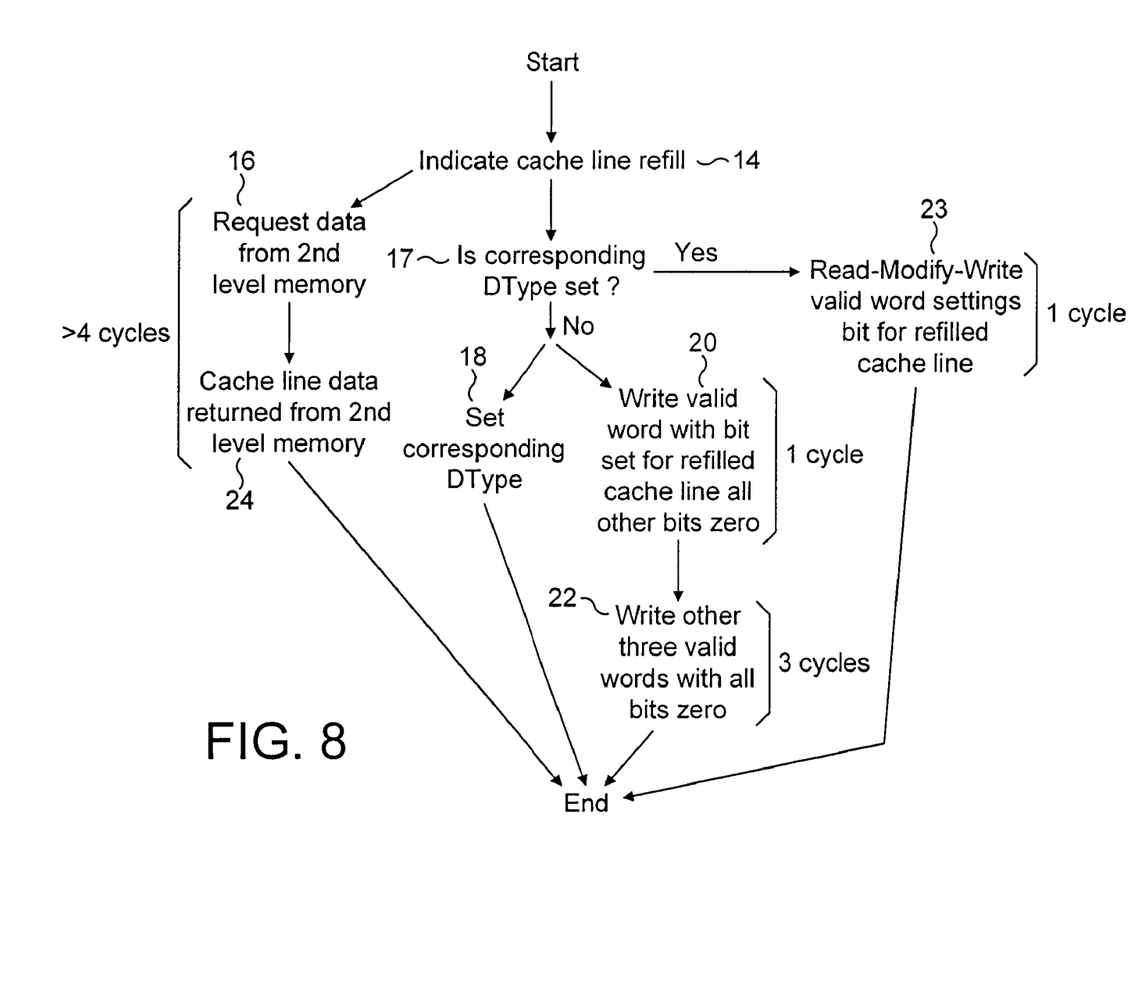
FIG. 8 schematically illustrates the steps performed when processing a cache line refill during normal processing.

FIG. 8 schematically illustrates processing operations performing when conducting a cache line refill during normal processing. In FIG. 5, the operations followed a global invalidate and so the D Types were known to be unset. The processing of FIG. 8 is the same as that for FIG. 5 except that at step 17 a check is made as to whether the corresponding D Type is set. If the result of this determination is yes, then processing proceeds to step 23 where a read-modify-write operation is made to set (it may already be set) the bit within the valid word corresponding to the cache line being refilled. If the determination at step 17 indicated no, then processing proceeds to step 18 and follows the steps discussed in relation to FIG. 15.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   (i) a valid word memory operable to store a plurality of valid words, each valid word having bits representing whether or not corresponding data storage locations in a further memory are storing valid data; and
   (ii) a plurality of flip-flop circuits operable to store values corresponding to a valid word, said stored values indicative of whether or not corresponding said valid words within said valid word memory are themselves valid
   wherein, one of said flip-flop circuits is operable to store a value indicative of validity of a number of said valid words which number varies in dependence upon how many valid words may be stored in said valid word memory.

2. Apparatus as claimed in claim 1, wherein said plurality of flip-flop circuits may be subject to a global invalidate operation to force all values stored in said plurality of flip-flop circuits to indicate that all valid words within said valid memory are themselves invalid.

3. Apparatus as claimed in claim 1, wherein said further memory is a cache memory and said data storage locations are cache lines.

4. Apparatus as claimed in claim 3, wherein upon a cache fill operation when a value stored in a flip-flop circuit and a corresponding valid word are changed to indicate validity of a cache line to be filled, any other valid words corresponding to said flip-flop circuit are changed in parallel with said cache fill operation to indicate invalidity of their corresponding cache lines.

5. Apparatus as claimed in claim 1, wherein valid words stored within said valid memory and values stored within said plurality of flip-flop circuits are read in parallel and logically combined to determine validity of a storage location within said further memory.

6. A method of processing data, said method comprising the steps of:
   (i) storing a plurality of valid words within a valid word memory, each valid word having bits representing whether or not corresponding data storage locations in a further memory are storing valid data; and
   (ii) storing within a plurality of flip-flop circuits values indicative of whether or not corresponding valid words within said valid memory are themselves valid; characterised in that
   (iii) a flip-flop circuit stores a value indicative of validity of a number of valid words which varies in dependence upon how many valid words may be stored in said valid memory.

7. A method as claimed in claim 6, wherein said plurality of flip-flop circuits may be subject to a global invalidate operation to force all values stored in said plurality of flip-flop circuits to indicate that all valid words within said valid memory are themselves invalid.

8. A method as claimed in claim 6, wherein said further memory is a cache memory and said data storage locations are cache lines.

9. A method as claimed in claim 8, wherein upon a cache fill operation when a value stored in a flip-flop circuit and a corresponding valid word are changed to indicate validity of a cache line to be filled, any other valid words corresponding to said flip-flop circuit are changed in parallel with said cache fill operation to indicate invalidity of their corresponding cache lines.

10. A method as claimed in claim 9, wherein valid words stored within said valid memory and values stored within said plurality of flip-flop circuits are read in parallel and logically combined to determine validity of a storage location within said further memory.

* * * * *